March 23, 1965 J. W. HARRISON 3,175,027
METHOD OF MAKING ELASTIC FILM CAPS
Original Filed March 12, 1959
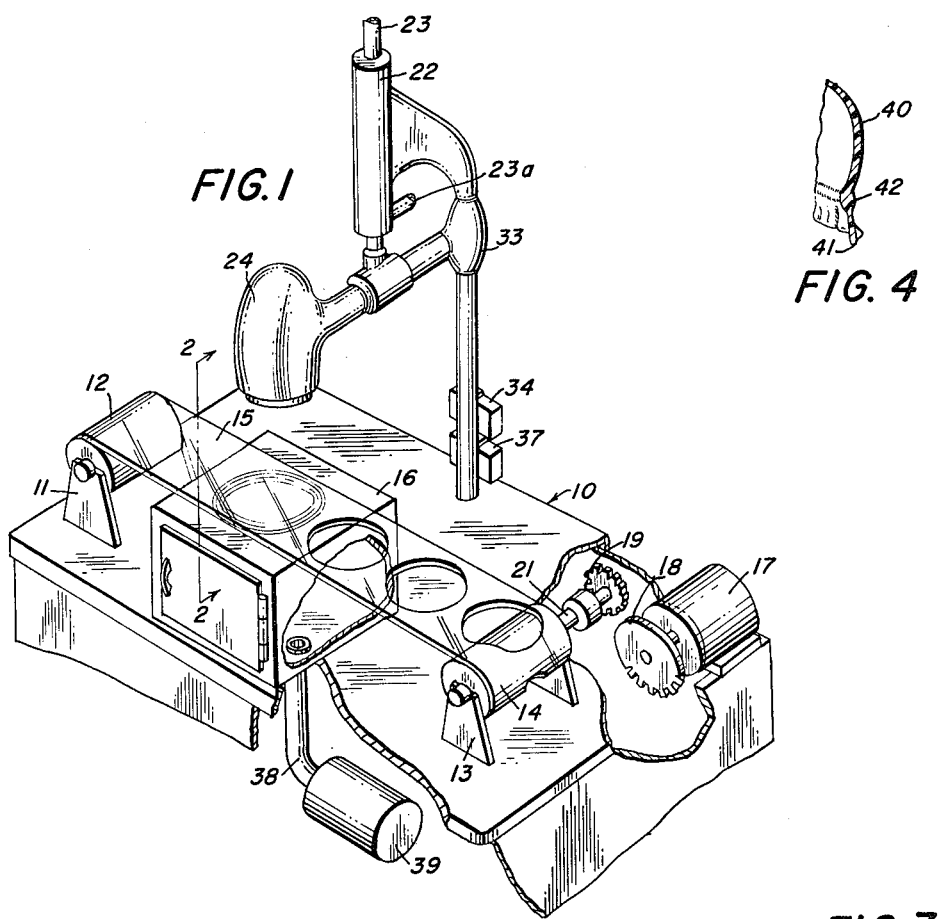
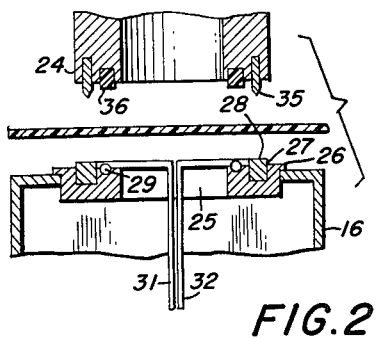
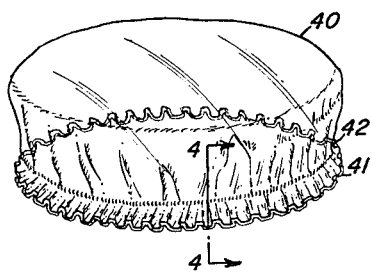
INVENTOR
JOHN W. HARRISON
BY Charles E. Parker
ATTORNEY

United States Patent Office 3,175,027
Patented Mar. 23, 1965

3,175,027
METHOD OF MAKING ELASTIC FILM CAPS
John W. Harrison, Winchester, Mass., assignor to W. R. Grace & Co., Cambridge, Mass., a corporation of Connecticut
Original application Mar. 12, 1959, Ser. No. 798,869. Divided and this application Apr. 30, 1962, Ser. No. 191,365
3 Claims. (Cl. 264—230)

This is a division of my earlier copending application filed March 12, 1959, in the United States Patent Office under Serial No. 798,869, and now abandoned.

Elastic margin film caps have found wide use as dust covers for laboratory glassware, covers for refrigerator dishes and jars, bathing caps, and many other uses. They are commonly made by stitching a stretched marginal band of elastic rubber around the periphery of a disc of film. When the rubber relaxes, it gathers or shirrs the margin and pulls the disc into a cap shape. Commonly, the method used to hold the elastic band is to enclose it within a folded marginal fabric tape.

I have discovered a far cheaper way of producing these useful items. Accordingly, it is an object of this invention to produce such caps in a completely automatic manner; to avoid the necessity for elastic bands or tape; to make an entirely unitary cap; to give elastic properties to the margin of the cap; and to supply film covers for dish or tray-packed foodstuffs which may be placed on the container by the packer, but removed by the housewife and reused as a cover for the particular container so long as any foodstuff remains.

My invention is based on my discovery that if a film having high shrink energy is restrained and heat is applied to the margin or along a narrow line adjacent to the margin, and if, after heating, the restraint on the film is immediately released, the effect on the film is similar to that of sewing an elastic thread under tension onto a fabric or film. The line along which the heat was applied thickens materially as the material is drawn into the shrunk area, becoming, in many instances, as much as 10 times as thick as the remaining areas in the film. It is a special feature of this invention that the heated line, which is in this instance adjacent to the periphery of the cap, becomes what is an essentially permanent, rubber-like elastic area capable of stretching and retracting repeatedly. The relaxed perimeter of this heated zone is much less than the original dimension. Consequently, the unheated panel area inside the heated peripheral zone is puckered into a cap shape. This change, in what was essentially a film having a very limited "elastic" property, is a necessary property. Commercially available, oriented, heat shrinkable materials exhibit this effect to some degree, for example, oriented saran, rubber hydrochloride, and (poly)ethylene terephthalate film will pucker and form a cap shape of limited elasticity. But very high shrink energy appears to be necessary to form the effective caps of this invention. The chemical structure of the film appears to be unimportant. The necessary physical properties, however, of any film which is suitable for the purposes of this invention appear to be the following:

(a) The film material should have been stretched so that when heated up to 96° C. it will shrink at least 20 percent in each direction.

(b) Its shrink energy, i.e., the pull exerted during shrinking, should approximate 100 pounds or more per square inch of cross section.

(c) The heated area on cooling should remain in a permanently "elastic"* condition.

I have found that polyethylene film which has been irradiated to a dosage of between 2 to 200 megarads and after irradiation has been stretched biaxially to a material degree possesses this property.

In the case of properly chosen films, the heated area becomes permanently elastic. After stretching, it may take a small degree of permanent set (about 10 percent) but thereafter it stabilizes and will withstand repeated stretching without undergoing any substantial change in dimension.

FIGURE 1 illustrates in perspective a machine for manufacturing such caps automatically.

FIGURE 2 is a cross section of a portion of the machine on the line 2—2 of FIGURE 1.

FIGURE 3 illustrates a jar cover made on the machine of FIGURE 1.

FIGURE 4 is an enlarged cross section of the cover taken on the line 4—4 of FIGURE 3.

Referring to FIGURE 1, the machine comprises a base 10 on which is mounted a support 11 for the supply roll 12. A companion support 13 for the waste take-up roll 14 is mounted on the opposite end. Film 15 which unwinds from supply roll 12 is carried across the top of a small vacuum chest 16. Drive for the machine is secured by motor 17 through intermittent gearing diagrammatically indicated by the gears 18 and 19. When the teeth of these gears intermesh, film 15 is advanced to the next indexing position.

Whenever the shaft 21 of the waste take-up roll comes to rest, a small microswitch (not shown) energizes a double-acting electro pneumatic valve (not shown) which admits air to the air cylinder 22 through the conduits 23, and exhausts air beneath the piston through conduit 23a. Pressure head 24 is thus forced into contact with the film.

Referring to FIGURE 2, it will be seen that the vacuum chest 16 carries a large orifice 25 which faces upwardly. A portion of this orifice is occupied by a ring 26 of heat-resistant material such as asbestos-cement insulating board. Ring 26 carries a channel 27 in which is placed a knife-bedding ring 28 of some relatively soft substance preferably heat-resistant rubber. Immediately inside the ring 28, a ring 29 of resistance wire is fastened to the heat-resistant asbestos-cement ring 26. When the head 24 is lowered by the piston, bracket 33 comes into contact with microswitch 34 and energizes the resistance wire ring 29 through the electrical conductors 31 and 32. Meanwhile, the knife 35 which is fitted into the end of the head 24 has severed a disc from the film 15 and film 15 is also pushed into firm contact with the resistance wire by means of a ring 36 of compressible heat-resistant rubber. Restraint at the moment of heating is thus secured. A controlled amount of heat only should act on each disc of film material. Consequently, resistance wire 29 after its original energization is almost immediately timed out by the action of a timing device 37. Time-out varies according to the thickness and nature of the film, but as an example, if the film be 1 mil thick irradiated polyethylene and the diameter of the ring of resistance wire be approximately 3¼ inches, time-out should occur after approximately 120 watt seconds have been released by the resistance wire.

As soon as gear 19 begins its movement again, air pressure in cylinder 22 is reversed and head 24 rises. Quite a small fan 39 or some other vacuum-producing device is connected to the chamber 16 through the con- ---
*Note: "Elastic" is used in its popular sense as possessing the properties of extensibility and retractibility associated with vulcanized rubber.

duit 38 to create a small pressure differential between the atmosphere and that within the chamber. As the head 24 rises and releases the film, this pressure differential pushes the newly formed cap into the vacuum chamber. Successive caps collect in it and may be removed periodically.

The caps which are formed are shown in FIGURE 3. It will be noticed that the cap 40 is characterized by a shirred margin 41 and by a much thicker ring 42 of the same material as the cap. As has been stated, ring 42 is permanently elastic and behaves like an elastic band. The cap can, consequently, be snapped over a bowl or a jar mouth and is effective to prevent desiccation in refrigerators or prevent foreign material from falling into an opened jar.

The air temperature should be appropriate to the film used. As an example, the time of heating of a 1 mil film of irradiated polyethylene when the air reaching the film is between 300–400° F. is about one second.

Although designed as a throw-away item, bathing caps made by this procedure are very strong, tough and elastic enough to keep the hair from getting wet. They may be used for a considerable time before being discarded.

I claim:

1. The method of making film caps from biaxially oriented films capable of shrinking at least 20 percent in both directions when heated to 96° C. which includes restraining the film from movement by clamping it in a zone adjacent the periphery of said film, momentarily and while shielding all other areas of the film from heat, heating a second peripheral zone of said film to heat-shrinking temperature, immediately upon the cessation of heating releasing the restraint imposed upon the film, and thereafter allowing the film to shrink freely and to cool, thereby reducing the diameter of the heated peripheral zone at least 20 percent and forming a shirred cap having a permanently elastic margin.

2. The method according to claim 1 in which said second peripheral zone is pressed against a resistance wire and the wire is thereupon subjected to a pulse of heating current, all but the peripheral area of said film being meanwhile shielded from the heat.

3. The method according to claim 1 wherein a zone adjacent to the periphery of the film is secured by pinching it between die elements and the exposed peripheral zone is heated by a blast of hot gas, all but the peripheral area meanwhile being shielded from the heat.

References Cited by the Examiner
UNITED STATES PATENTS

| | | | |
|---|---|---|---|
| 1,651,952 | 12/27 | Hayden | 18—2 |
| 1,801,085 | 4/31 | Humphrey | 18—2 |
| 2,517,581 | 8/50 | Lowry et al. | 18—48 |
| 2,521,388 | 9/50 | Maynard et al. | 18—19 |
| 2,547,275 | 4/51 | Lyon | 18—19 |
| 2,885,105 | 5/59 | Heyl et al. | 18—56 |
| 2,942,300 | 6/60 | Masters | 18—47.5 |
| 2,952,879 | 9/60 | Kitson et al. | 18—48 |
| 2,962,025 | 11/60 | Bertrand | 18—48 |

FOREIGN PATENTS 761,075   11/56   Great Britain.

ROBERT F. WHITE, Primary Examiner.

MORRIS LIEBMAN, ALEXANDER H. BRODMERKEL, Examiners.